(No Model.)

W. H. DODGE.
PULLEY.

No. 422,507.  Patented Mar. 4, 1890.

Attest
W. B. Hosford
Nell W Dodge

Inventor
Wallace H. Dodge
By his Atty
R. D. O. Smith

UNITED STATES PATENT OFFICE.

WALLACE H. DODGE, OF MISHAWAKA, INDIANA.

PULLEY.

SPECIFICATION forming part of Letters Patent No. 422,507, dated March 4, 1890.

Application filed June 5, 1889. Serial No. 313,153. (No model.)

*To all whom it may concern:*

Be it known that I, WALLACE H. DODGE, of Mishawaka, in the county of St. Joseph and State of Indiana, have invented new and useful Improvements in Pulleys; and I do hereby declare that the following is a full and accurate description of the same, having reference to the accompanying drawings, wherein—

Figure 1:
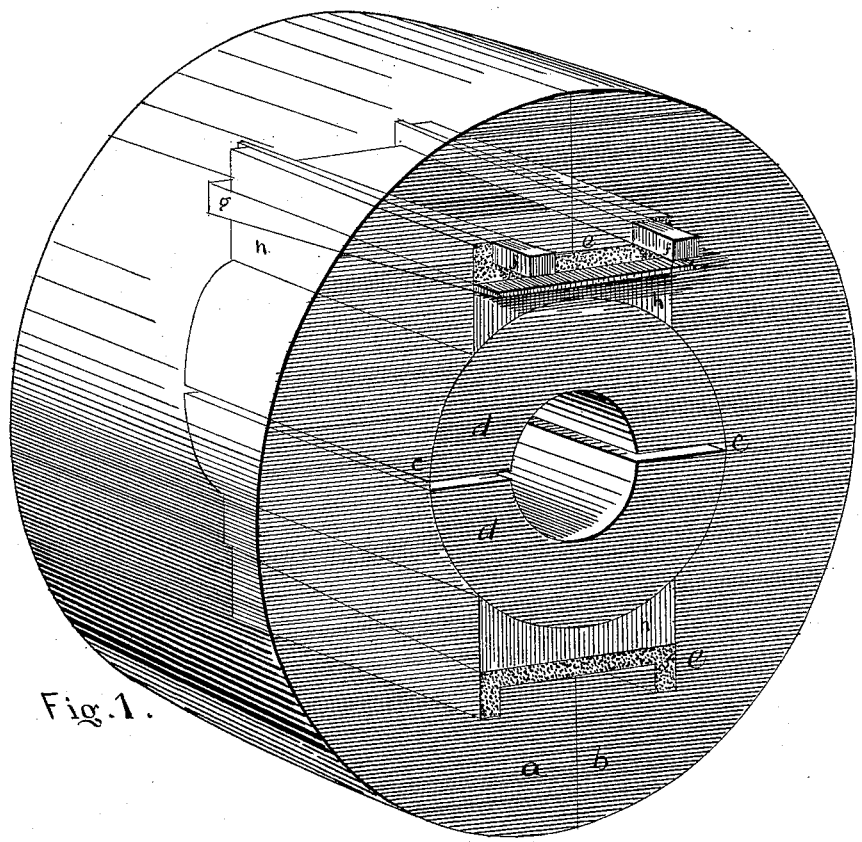
Figure 4:
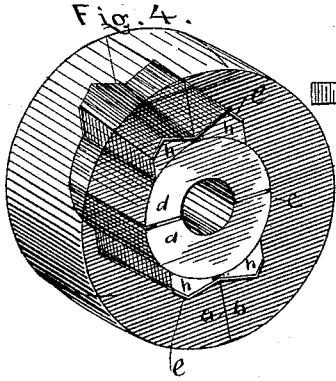
Figure 2:
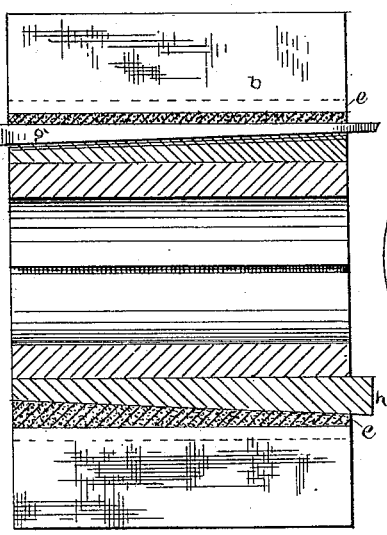
Figure 3:
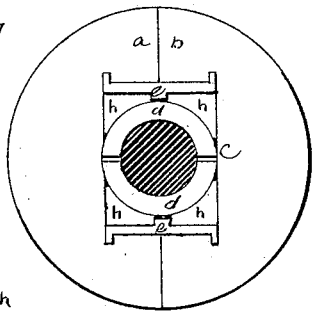

Figure 1 is a perspective view of my pulley before wedges are cut off. Fig. 2 is a section in plane of the axis. Figs. 3 and 4 are modifications.

In Figs. 1 and 4 the pulleys are represented as of transparent material to show more clearly the interior structure.

This invention relates to that class of pulleys known as "split pulleys;" and its object is to construct a solid wooden pulley, very small in diameter in proportion to the size of the shaft on which it is to be placed.

On July 4, 1882, Letters Patent No. 260,462 were granted to W. H. Dodge and George Philion for an improvement in pulleys, and in said patent was described and claimed a separable pulley provided with a separable interchangeable bush as a means of adapting a pulley to fit a shaft of any size less than the diameter of the standard hub-bore.

My present invention is an improved mode of fastening together the two halves of the pulley and compressing upon the shaft the bush described in said patent by a system of interlocking keys and wedges which hold the parts and force the bush without causing it to be eccentric.

The conditions under which the bush in a pulley must be employed are these: The exterior surface of the bush must be exactly fitted to the central opening of the hub, and its internal surface must exactly fit the shaft on which on which it is to be placed. Thus the initial relations of the pulley on the bush and the bush on the shaft are those of complete adaptation or fit. The surfaces are all in contact without force. This being the initial relation, it follows that whatever degree of pressure may be necessary to secure the required tractive friction between said parts is unaccompanied by motion or change of form, and it appears evident that if it be sought to secure the desired tractive friction between the pulley, bush, and shaft which have not the initial adaptation and fit, it can only be secured by forcible change of form and sacrifice of truth.

In the pulley patented to Dodge and Philion the compressive strain is secured by clamping-bolts which pass through the hub transverse to the axis, and said strain is therefore toward the center, tending to draw the parts of the pulley together, and said strains being resisted by the solid shaft there is no tendency to alter the form of any part.

I am aware that separable pulleys have been made with tapered bushings adapted to interlock with the separable halves of the pulley in such a way that said halves are locked together by the presence of the bushing; but in all such pulleys the bushings are also in halves, and as they are also wedges they act to secure pressure upon the shaft by pressing outward on the parts of the pulley. They therefore exert a disrupting force on the pulley. It is also evident that the two halves of the bush being wedges must in every instance be inserted in the hub to exactly the proper distance, or the axis of the shaft will be made eccentric to the axis of the pulley.

My invention relates to the pulleys of this latter description; but it is highly desirable, for reasons of economy in manufacture, as well as for reasons of ease and accuracy in use, to make the bushings in the form heretofore used by me under the Dodge and Philion patent referred to above, and I propose to obviate the defects pointed out by a bush separate and distinct from the compressing-wedge, and also so that it may have a distinctive seat in the halves of the hub and be subjected to the required compressive strain without being made eccentric to the pulley if the pressure of the wedge on one side is not exactly balanced by the pressure on the other side.

The pulley is made in two parts *a b*, cut from a solid pulley or fitted together on adjoining surfaces, and in each of said parts a recess *c* is made in the adjoining surfaces, adapted to receive a bush *d* and two keys *e e*, whereby the two halves of the pulley may be fastened together. The bush may be centerbored to fit a shaft of any desired size, and being interchangeable the same pulley, by different bushes, may be adapted to shafts of various sizes. The keys $e$ are constructed to span across the plane of junction of the parts $a\,b$ and hold said parts firmly together and at the same time furnish a basis for forcing the bush against the shaft with sufficient pressure to grip the shaft and hold the pulley without set-screws or keys.

To accomplish the holding together of the parts $a\,b$, the recesses $c$ are undercut, so that when both bush and keys are in operative position the recesses are filled and the keys interlock with the parts $a\,b$ and restrain them from separation. The compressive movement of bush is due to wedging between the bush and the undercut surface of the recess $c$, and this wedging action may be secured by making the keys $e$ wedge-formed longitudinally, or by employing separate wedges $h\,h$ between the keys and the bush, as may be preferred.

It may be desirable to force together the adjoining faces of the parts $a\,b$, and for that purpose wedges $f$ may be employed. It is evident the forms of the interlocking keys $e$ and that the forms of the undercut surfaces $c$ may also be greatly varied, as the prime requisite is merely that they shall be undercut and so interlocked with the keys that the parts $a\,b$ cannot separate when all parts are in place on the shaft.

In the construction shown in Fig. 3 each key is held in place by two wedges $h\,h$, the parts being tapered in the same manner as shown in the lower portion of Fig. 1.

In Fig. 4 the key is comparatively thin and is not tapered in thickness, but a wedging action is secured by tapering or inclining the undercut recesses $c$ of the parts $a$ and $b$ of the pulley, against which the keys are held each by two wedges $h\,h$.

Having described my invention, I claim as new—

1. A split pulley consisting of two portions whose line of separation extends from periphery to periphery through the middle, provided with keys which extend across the line of separation and interlock with the separable portions to hold the same together, and with wedges acting in radial directions—that is to say, outwardly toward the key-seats and inwardly toward the shaft—to clamp and fasten the pulley on the same, as set forth.

2. A split pulley, constituted by dividing a solid pulley on a line passing from periphery to periphery, provided with keys which cross said line of separation and interlock with said separable parts to hold the same together, and wedges acting in radial directions between said keys and key-seats and the shaft in the middle, to clamp and hold the pulley on the shaft, as set forth.

3. A split pulley consisting of two portions whose line of separation extends from periphery to periphery through the middle, provided with keys which extend across the line of separation and interlock with the separable portions to hold the same together, with an interchangeable separable bush, and with wedges acting between said bush and said keys, for the purpose set forth.

4. A split pulley consisting of two portions whose line of separation extends from periphery to periphery through the middle, provided with keys which extend across the line of separation and interlock with the separable portions to hold the same together, with wedges acting in radial directions—that is to say, outwardly toward the key-seats and inwardly toward the middle—and with an interchangeable separable bush having seats in said pulley portions independent of the wedges, as and for the purpose set forth.

5. In a split pulley, two separate portions having the line of separation from periphery to periphery through the middle, combined with keys wedge shaped longitudinally and provided with portions to interlock with said pulley parts and hold the same together, whereby the clamping-wedges and interlocking keys are combined in the same parts.

WALLACE H. DODGE.

Witnesses:
W. B. HOSFORD,
CHAS. ENDLICH.